United States Patent
Mayo (10) Patent No.: US 10,496,313 B2
(45) Date of Patent: Dec. 3, 2019

(54) IDENTIFICATION OF CONTENT-DEFINED CHUNK BOUNDARIES

(71) Applicant: HEWLETT PACKARD ENTERPRISE DEVELOPMENT LP, Houston, TX (US)

(72) Inventor: Richard Phillip Mayo, Stoke Gifford Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 285 days.

(21) Appl. No.: 15/500,077

(22) PCT Filed: Sep. 22, 2014

(86) PCT No.: PCT/US2014/056755
§ 371 (c)(1),
(2) Date: Jan. 30, 2017

(87) PCT Pub. No.: WO2016/048263
PCT Pub. Date: Mar. 31, 2016

(65) Prior Publication Data
US 2017/0242615 A1    Aug. 24, 2017

(51) Int. Cl.
*G06F 17/30* (2006.01)
*G06F 3/06* (2006.01)
(Continued)

(52) U.S. Cl.
CPC .......... *G06F 3/0641* (2013.01); *G06F 3/0608* (2013.01); *G06F 3/0644* (2013.01); *G06F 3/0685* (2013.01); *G06F 11/1453* (2013.01);

*G06F 16/00* (2019.01); *G06F 16/1752* (2019.01); *G06F 2201/83* (2013.01)

(58) Field of Classification Search
CPC .................................................. G06F 16/1752
See application file for complete search history.

(56) References Cited

U.S. PATENT DOCUMENTS

| 4,309,569 A | 1/1982 | Merkle |
| 4,611,272 A | 9/1986 | Lomet |

(Continued)

FOREIGN PATENT DOCUMENTS

| CN | 103218574 | 7/2013 |
| WO | 2002080071 | 10/2002 |

(Continued)

OTHER PUBLICATIONS

Bhagwat et al., "Extreme Binning: Scalable, Parallel Deduplication for Chunk-based File Backup," Sep. 2009, <http://www.hpl.hp.com/personal/Mark_Lillibridge/Extreme/final.pdf>.

(Continued)

*Primary Examiner* — Syed H Hasan
(74) *Attorney, Agent, or Firm* — Hewlett Packard Enterprise Patent Department (57) ABSTRACT

Examples include application of a variable-sized content-defined chunking technique to a first data portion to identify a content-defined chunk boundary at least partially defining a remainder section, merging of the remainder section with a second data portion ordered before the first data portion to create a merged section, and application of the chunking technique to the merged section.

17 Claims, 4 Drawing Sheets

(51) Int. Cl.
  *G06F 11/14* (2006.01)
  *G06F 16/00* (2019.01)
  *G06F 16/174* (2019.01)

(56) References Cited

U.S. PATENT DOCUMENTS

| | | | |
|---|---|---|---|
| 5,583,859 | A | 12/1996 | Feldmeier |
| 6,105,018 | A | 8/2000 | Demers et al. |
| 6,226,634 | B1 | 5/2001 | Ogihara et al. |
| 6,279,149 | B1 | 8/2001 | Field et al. |
| 6,529,951 | B1 | 3/2003 | Okuyama et al. |
| 6,859,455 | B1 | 2/2005 | Yazdani et al. |
| 6,968,402 | B2 | 11/2005 | Jackson et al. |
| 7,538,770 | B2 | 5/2009 | Chen |
| 7,814,284 | B1 | 10/2010 | Glass et al. |
| 7,992,037 | B2 | 8/2011 | Dubnicki et al. |
| 8,161,255 | B2 | 4/2012 | Anglin et al. |
| 8,214,517 | B2 | 7/2012 | Dubnicki et al. |
| 8,539,179 | B1 | 9/2013 | Stringham |
| 8,583,625 | B2 | 11/2013 | Peterson et al. |
| 8,639,669 | B1* | 1/2014 | Douglis .............. G06F 3/0641 707/692 |
| 8,825,720 | B1 | 9/2014 | Xie et al. |
| 9,003,139 | B1 | 4/2015 | Shivdeo et al. |
| 9,047,334 | B1 | 6/2015 | Cheriton |
| 9,367,557 | B1* | 6/2016 | Lin .................... G06F 16/1744 |
| 9,432,192 | B1 | 8/2016 | Pogde et al. |
| 9,678,978 | B2 | 6/2017 | James et al. |
| 2004/0024807 | A1 | 2/2004 | Cabrera et al. |
| 2005/0131860 | A1 | 6/2005 | Livshits |
| 2007/0071339 | A1 | 3/2007 | Yang et al. |
| 2007/0094060 | A1 | 4/2007 | Apps et al. |
| 2007/0276843 | A1 | 11/2007 | Lillibridge et al. |
| 2009/0037456 | A1 | 2/2009 | Kirshenbaum et al. |
| 2009/0150426 | A1 | 6/2009 | Cannon et al. |
| 2009/0228511 | A1 | 9/2009 | Atkin et al. |
| 2010/0082636 | A1 | 4/2010 | Kruus et al. |
| 2010/0205163 | A1 | 8/2010 | Eshghi et al. |
| 2011/0046775 | A1 | 2/2011 | Bailey et al. |
| 2011/0131185 | A1 | 6/2011 | Kirshenbaum |
| 2011/0246869 | A1 | 10/2011 | Vion-Dury |
| 2012/0102469 | A1 | 4/2012 | Kapoor et al. |
| 2012/0131025 | A1 | 5/2012 | Cheung et al. |
| 2012/0200567 | A1* | 8/2012 | Mandel ............... G06T 11/206 345/420 |
| 2012/0203745 | A1 | 8/2012 | Myers et al. |
| 2012/0233417 | A1 | 9/2012 | Kalach et al. |
| 2013/0054544 | A1 | 2/2013 | Li et al. |
| 2013/0290275 | A1* | 10/2013 | Stoakes ............... G06F 3/0608 707/692 |
| 2014/0006363 | A1* | 1/2014 | Constantinescu .... G11B 27/032 707/692 |
| 2014/0189270 | A1 | 7/2014 | Iwanicki et al. |
| 2014/0222770 | A1 | 8/2014 | Lad et al. |
| 2014/0258245 | A1* | 9/2014 | Estes .................. G06F 16/1748 707/692 |
| 2015/0081994 | A1 | 3/2015 | Christopher et al. |
| 2015/0095596 | A1 | 4/2015 | Yang et al. |
| 2015/0227436 | A1* | 8/2015 | Wilson ............... G06F 16/1748 707/692 |
| 2016/0004705 | A1* | 1/2016 | Petrocik ............ G06F 16/24578 707/727 |
| 2017/0249218 | A1* | 8/2017 | Falkinder .............. G06F 16/182 |
| 2018/0048567 | A1* | 2/2018 | Ignatchenko ....... H04L 45/3065 |

FOREIGN PATENT DOCUMENTS

| | | |
|---|---|---|
| WO | 2012067964 | 5/2012 |
| WO | 2012112121 | 8/2012 |
| WO | 2013165389 | 11/2013 |
| WO | 2014105906 | 7/2014 |
| WO | WO-2016043757 | 3/2016 |

OTHER PUBLICATIONS

BingChun Chang, "A Running Time Improvement for Two Thresholds Two Divisors Algorithm," Master's Projects, 2009, Paper 42, <http://scholarworks.sjsu.edu/cgi/viewcontent.cgi?article=1041 &,context=etd_projects>.

Eshghi et al., "A Framework for Analyzing and Improving Content-Based Chunking Algorithms," Hewlett-Packard Labs Technical Report, TR 2005-30, Sep. 22, 2005, <http://www.hpl.hp.com/techreports/2005/HPL-2005-30R1.html>.

Eshghi et al., "Jumbo Store: Providing Efficient Incremental Upload and Versioning for a Utility Rendering Service," May 3, 2007, < http://www.hpl.hp.com/techreports/2006/HPL-2006-144R1.pdf>.

Evans, P., "Config:XPath—Retrieve Configuration Data From Xml Files by Using XPath," (Web Page), CPAN, Aug. 20, 2014, 7 pps, <http://search.cpan.org/~pevans/Config-XPath-0.16/lib/Config/XPath.pm>.

Heckel, P. C., "Minimizing Remote Storage Usage and Synchronization Time Using Deduplication and Multichunking: Syncany as an Example," (Web Page), May 20, 2013, 20 pps., <http://blog.philippheckel.com/2013/05/20/minimizing-remote-storage-usage-and-synchronization-time-usingdeduplication-multichunking-syncany-as-an-example/3/>.

Hewlett-Packard Development Company, L.P., "HP Universal Print Driver: Solution and Feature Guide," 2009, pp. 1-24.

ISR/WO, PCT/US2014/056347, HP reference 84030861, dated Apr. 30, 2015, 11 pps.

ISR/WO, PCT/US2014/056755, HP reference 84030874, dated Apr. 30, 2015, 9 ps.

J. Chapweske, "Tree Hash EXchange format (THEX)," Mar. 4, 2003, <http://adc.sourceforge.net/draft-jchapweske-thex-02.html>.

Litwin, W. et al., "Combining Chunk Boundary and Chunk Signature Calculations for Deduplication," IEEE Latin America Transactions, vol. 10, No. 1, pp. 1305-1311, Jan. 2012, See p. 1305 and figure 1.

Lkhagvasuren et al., "Multi-level Byte Index Chunking Mechanism for File Synchronization," 2014, International Journal of Software Engineering and Its Applications, vol. 8, pp. 339-350, <http://www.sersc.org/journals/IJSEIA/vol8_no3_2014/31.pdf>.

Moinakg, "High Performance Content Defined Chunking," The Pseudo Random Bit Bucket, Jun. 22, 2013, <https://moinakg.wordpress.com/2013/06/22/high-performance-content-defined chunking/>.

Rago et al., "Using Eager Strategies to Improve NFS I/O Performance," International Journal of Parallel, Emergent and Distributed Systems 28.2, 2013, pp. 134-158, <http://www.nec-labs.com/uploads/Documents/Storage-Systems/nfseager.pdf>.

Ripple Wiki, "Hash Tree," (Web Page), May 15, 2014, 3 pps. <https://ripple.com/wiki/Hash_Tree>.

Stack Exchange Inc., "Looking for Cryptographic Secure Hash Algorithm(s) That Produces Identical Root Hash or Differently Sliced Hash List," (Web Page), Aug. 20, 2014, 5 pps. <http://crypto.stackexchange.com/questions/490/looking-for-cryptographic-secure-hash-algorithms-that-produces-identical-root>.

Taneja Group, "The HP Solution to Backup Complexity and Scale: HP Data Protector and StoreOnce," May 2014, <http://h20195.www2.hp.com/V2/GetDocument.aspx?docname=4AA5-2973ENW &cc=us&lc=en>.

Wikipedia, "Distributed Hash Table," (Web Page), May 23, 2014, 8 pps. <http://en.wikipedia.org/wiki/Distributed_hash_table>.

Wikipedia, "Fingerprint (computing)," Sep. 2, 2014, <http://en.wikipedia.org/wiki/Fingerprint_(computing)>.

Wikipedia, "Hash function," Sep. 8, 2014, <http://en.wikipedia.org/wiki/Hash_function>.

Wikipedia, "Mask (computing)," Apr. 26, 2014, <http://en.wikipedia.org/wiki/Mask_(computing)>.

Wikipedia, "Rabin fingerprint," Apr. 15, 2014, <http://en.wikipedia.org/wiki/Rabin_fingerprint>.

Wikipedia, "Rolling hash," Jul. 9, 2014, <http://en.wikipedia.org/wiki/Rolling_hash>.

Wikipedia, "Tahoe-LAFS," Jul. 24, 2014, <http://en.wikipedia.org/wiki/Tahoe-LAFS>.

Wikipedia, "Cryptographic hash function," Aug. 5, 2014 <http;//en,wikipedia.org/wiki/Cryptographic_hash_function>.

(56) References Cited

OTHER PUBLICATIONS

Wikipedia, "Hash list," May 15, 2013, <http://en.wikipedia.org/wiki/SHA-1>.
Wikipedia, "Merkle tree," Aug. 3, 2014, <http://en.wikipedia.org/wiki/Merkle_tree>.
Wikipedia, "SHA-1," Aug. 26, 2014, <http://en.wikipedia.org/wiki/SHA-1>.
Zhanjie, Wang et al., "Research on Distributional Stability of Chunk Sizes in Data Chunking," International Journal of Digital Content Technology and its Applications (JDCTA), vol. 7, No. 5. pp. 443-450, Mar. 2013, See pp. 445-447 and figure 2.
Yang, Tianming et al., "FBBM: A new Backup Method with Data De-duplication Capability," In: 2008 International Conference on Multimedia and Ubiquitous Engineering, pp. 30-35, Apr. 24-26, 2008, See pp. 30-31.

* cited by examiner

IDENTIFICATION OF CONTENT-DEFINED CHUNK BOUNDARIES

BACKGROUND

A computer system may generate a large amount of data, which may be stored locally by the computer system. Loss of such data resulting from a failure of the computer system, for example, may be detrimental to an enterprise, individual, or other entity utilizing the computer system. To protect the data from loss, a data backup system may store at least a portion of the computer system's data. In such examples, if a failure of the computer system prevents retrieval of some portion of the data, it may be possible to retrieve the data from the backup system.

BRIEF DESCRIPTION OF THE DRAWINGS

The following detailed description references the drawings, wherein.

DETAILED DESCRIPTION

Techniques such as data de-duplication may enable data to be stored in a backup system more compactly and thus more cheaply. By performing de-duplication, a backup system may generally store once each unique region or "chunk" of a collection of data (or "data collection" herein). Such a chunk may be referred to as a "data chunk" herein. In some examples, a backup system may perform de-duplication on the basis of content-based fingerprints, such as hashes, of the content of the data chunks of the data collection to be backed up. In such examples, the backup system may compare respective hashes of data chunks of a data collection provided for backup to hashes of previously stored data chunks to determine which data chunks of the provided data collection have not been previously stored in persistent storage of the backup system and thus are to be stored in the persistent storage.

In some examples, a technique used to divide a data collection into data chunks (referred to herein as a "chunking technique") may have a significant impact on the performance of de-duplication by the backup system. For example, the consistency of the chunking technique utilized may significantly impact de-duplication performance. For example, a chunking technique able to produce the same data chunks when provided the same data collection may result in good de-duplication performance, as the hashes of the data chunks of an incoming data collection are likely to match hashes of a previously stored data chunks when the same data collection has been stored previously.

Fixed-size chunking techniques, which divide a data collection into uniform data chunks each having the same size, may be simple and produce the same data chunks each time for the same data. However, even small changes in the data collection may shift data in the file, which may have cascading effects resulting in many of the fixed chunks being different from the original collection, even if the actual change to the data collection is small.

Variable-size content-defined chunking techniques, such as the Basic Sliding Window (BSW) technique or the Two-Thresholds Two Divisors (TTTD) technique, may determine boundaries for data chunks of the data collection based on analysis of the content the data collection and divide the data collection into variable-sized chunks based on the content-defined chunk boundaries. This may avoid some of the cascading effects of changes described above in relation to fixed-size chunking techniques, and increase chunk consistency.

In some examples, a backup system may acquire a data collection in pieces (i.e., data portions). In some backup systems, it may be preferable to chunk the data portions of a data collection as they arrive for various reasons, including increased speed, lower buffering overheads, and the like. However, chunking the data portions as they arrive may result in different chunks than if the data collection were chunked from beginning to end in order. For example, a chunking technique that chunks an arbitrary portion of the data collection as it arrives may partition the data collection into chunks by treating each end of the portion as a chunk boundary even though those ends are not content-defined chunk boundaries (as would be identified when chunking the full data collection in order).

As a further complication, the data portions may arrive at the backup system out of order (i.e., in different orders from one time to the next) for various reasons. For example, when a backup client executes multiple threads concurrently for providing respective data portions of the data collection for backup, the respective speeds of these threads may vary, causing data portions to be written to the backup system in different orders at different times.

To address these issues, examples described herein may perform de-duplication on a data collection by chunking data portions of the data collection as the data portions are acquired by the backup system out of order, by merging remainder section(s) of previously-processed data portion(s) with later-processed data portion(s) and applying a variable-sized content-defined chunking technique to the resulting merged section(s).

Examples described herein may acquire, out of order, first and second data portions of an ordered collection of data to be backed up in the backup system, and apply a variable-size content-defined chunking technique to the first data portion to identify a first content-defined chunk boundary in the first data portion partially defining a remainder section of the first data portion. Examples may merge the remainder section with a second data portion, ordered before the first data portion and acquired after identification of the first chunk boundary, and apply the chunking technique to the merged section to identify a second content-defined chunk boundary in the merged section. Examples may further dispatch, to de-duplication comparison, a data chunk of the ordered collection, bounded by the first and second chunk boundaries, and determine whether to store the data chunk in persistent storage of the backup system based on the de-duplication comparison between respective representations of the data chunk and stored data chunks previously stored in the persistent storage. In this manner, examples described herein may chunk various data portions of a data collection, based on content-defined chunking boundaries, as the data portions arrive in an arbitrary order. For example, by maintaining remainder sections for merging with later-arriving data portions, chunks extending across ends of data portions acquired separately and out of order may be identified by examples described herein.

Figure 1:
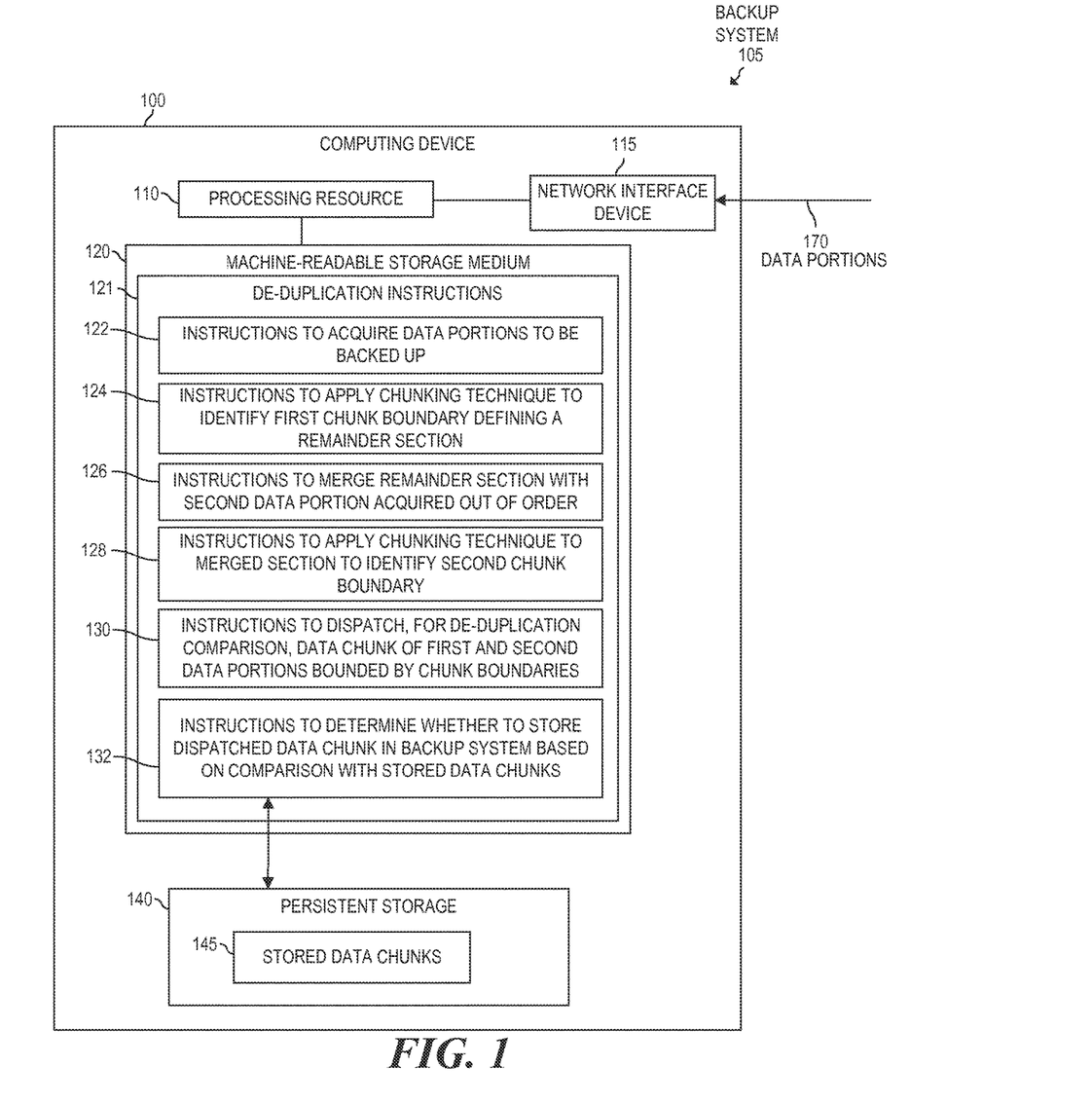
FIG. 1 is a block diagram of an example backup system to determine whether to store a data chunk in persistent storage of the backup system.

Referring now to the drawings, FIG. 1 is a block diagram of an example backup system 105 to determine whether to store a data chunk in persistent storage of backup system 105. In the example of FIG. 1, backup system 105 comprises a computing device 100 at least partially implementing backup system 105. Computing device 100 includes a processing resource 110 and a machine-readable storage medium 120 comprising (e.g., encoded with) instructions 121 executable by processing resource 110. In the example of FIG. 1, instructions 121 include at least instructions 122, 124, 126, 128, 130, and 132, to implement at least some of the functionalities described herein. In some examples, storage medium 120 may include additional instructions. In other examples, the functionalities described herein in relation to instructions 121, and any additional instructions described herein in relation to storage medium 120, may be implemented as engines comprising any combination of hardware and programming to implement the functionalities of the engines, as described below.

As used herein, a "computing device" may be a server, blade enclosure, desktop computer, laptop (or notebook) computer, workstation, tablet computer, mobile phone, smart device, or any other processing device or equipment including a processing resource. In examples described herein, a processing resource may include, for example, one processor or multiple processors included in a single computing device or distributed across multiple computing devices. In the example of FIG. 1, computing device 100 includes a network interface device 115. In examples described herein, a "network interface device" may be a hardware device to communicate over at least one computer network. In some examples, a network interface may be a network interface card (NIC) or the like. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

Figure 2A:
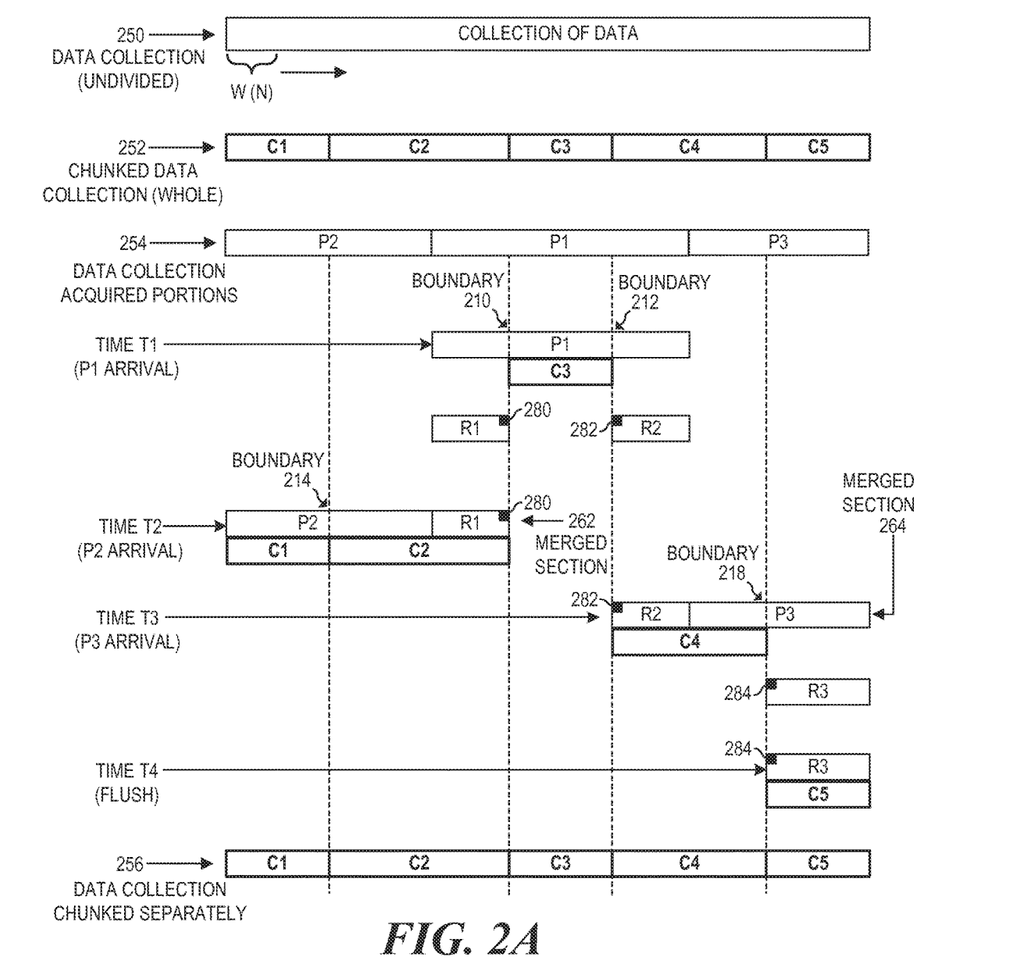
FIG. 2A includes diagrams of examples of applying a variable-sized content-define chunking technique.
Figure 2B:
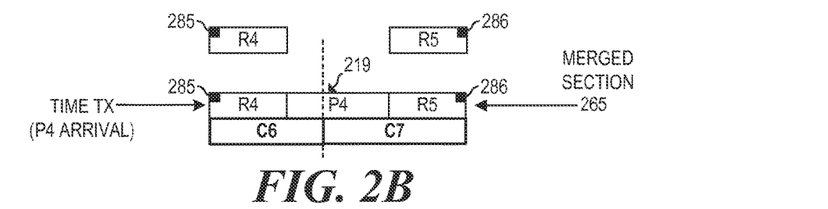
FIG. 2B is a diagram of an example formation of a merged section.

For ease of understanding, examples of de-duplication using chunking will be described herein in relation to FIGS. 1-26. FIGS. 2A and 26 diagrams of examples of applying a variable-sized content-define chunking technique and forming merged sections.

In the example of FIG. 1, instructions 122 may actively acquire (e.g., retrieve, etc.) or passively acquire (e.g., receive, etc.) data portions 170 of an ordered collection of data to be backed up in backup system 105. Instructions 122 may acquire data portions 170 via network interface device 115, either directly or indirectly (e.g., via one or more intervening components, services, processes, or the like, or a combination thereof). Instructions 122 may acquire the data portions 170 from a backup client computing device providing data to be backed up at backup system 105, from another computing device of backup system 105, or the like.

As an example, referring to FIG. 2A, a collection of data (or "data collection") 250 may be an ordered collection of data, where the order of data in the collection may be indicated by offsets (i.e., offset values) indicating the relative position of bytes within the data collection 250. As an example, each byte (or other unit) of data collection 250 may have a respective offset, the offsets beginning with zero and increasing sequentially, for example. In the example of FIG. 2A, data collection 250 is illustrated in an undivided state (e.g., as data collection 250 may be stored at a backup client device). FIG. 2A also illustrates an example chunked data collection 252, illustrating an example of how data collection 250 may be chunked by a variable-size content-defined chunking technique applied to data collection 250 in an undivided or whole state, such that the chunking technique, may be applied in a continuous manner from the front end (e.g., offset zero or the functional equivalent) to the back end (e.g., last offset or the functional equivalent) of undivided (whole) data collection 250. In the example of FIG. 2A, chunked data collection 252 is chunked into separate, non-overlapping data chunks C1-C5. In some examples, each data chunk may have a size on the order of about 4 kilobytes (KB). In other examples, data chunks may be of any other suitable size.

In examples described herein, a variable-size content-defined chunking technique may be any suitable chunking technique to divide a collection of data into smaller data chunks based on analysis of the content and such that the data chunks are not restricted to being a fixed size. In some examples, a variable-size content-defined chunking technique may determine boundaries for chunks of the data collection based on analysis of the content the data collection and divide the data collection into variable-sized chunks based on the determined boundaries, which may be referred to herein as "content-defined chunk boundaries". Examples of suitable variable-size content-defined chunking techniques include, for example, the Basic Sliding Window (BSW) technique, the Two-Thresholds Two Divisors (TTTD) technique, or the like. Example processes that may be part of a variable-size content-defined chunking technique are described below.

In some examples, a variable-size content-defined (VSCD) chunking technique may treat a data collection to be chunked as an ordered sequence of bytes forming the data collection, and may define a sliding window W (FIG. 2A) having a size "N" that is a suitable number of bytes. In some examples, moving from a front to a back of the data sequence (as illustrated in FIG. 2A), the VSCD chunking technique may sequentially slide bytes of the data collection into and out of the sliding window W in a first-in-first-out (FIFO) manner. Starting with the first N bytes of the data collection and generally moving one byte at a time toward the end of the data collection, the content of the N bytes in the window W are used to compute a rolling hash for the content (i.e., N bytes). In examples described herein, any suitable rolling hash technique may he used, such as the Rabin fingerprinting technique, or the like.

Each time a rolling hash is computed, the rolling hash is evaluated to determine whether the current end of sliding window W is to be considered a content-defined chunk boundary. In some examples, if the end of the current sliding window W is determined to he a content-defined chunk boundary, then the sliding window W is moved to the first N bytes after the end of the current sliding window W, and the process may be continued from there. In some examples, the content-defined chunk boundary may be defined as being at the offset of the byte occurring in the ordered data collection immediately after the last byte in the window when the boundary is identified. In other examples, boundaries may be identified in any other suitable manner.

In examples described herein, the evaluation of the rolling hash may be done in a variety of different manners. For example, the VSCD chunking technique may determine whether a rolling hash is one of a set of predefined breakpoint values, which may be defined to include any value having a predefined content (e.g., bits "11111111", etc.) at a predefined location (e.g., as the first eight bits), In such examples, when the rolling hash is determined to be one of the predefined breakpoint values, the current end of sliding window W is determined to be a content-defined chunk boundary. When the rolling hash is determined not to be one of the predefined breakpoint values, the sliding window W may be advanced one byte. In such examples, any suitable predefined content and location may be used. In other examples, the VSCD may utilize a predefined divisor D and a predefined remainder R, and determine that the current end of sliding window W is to be a content-defined chunk boundary when the remainder of the current rolling hash modulo D (hash mod D) equals predefined remainder R (as in the BSW technique).

In some examples, the VSCD chunking technique may also utilize other variations, such as implementation of minimum and maximum chunk sizes. For example, to implement a minimum chunk size, the VSCD chunking technique may start the sliding window W with the end of the window at a location where a chunk of the minimum size would end in the next set of bytes to analyze (i.e., the window starts at an offset defined by a last boundary offset, plus the minimum size value, minus the window size N). In this manner, the VSCD chunking technique may be prevented from defining a chunk boundary that would produce a chunk of less than the minimum size. In such examples, to implement a maximum chunk size, if the VSCD chunking technique reaches a maximum chunk size without finding a content-defined chunk boundary, as described above, then the maximum size boundary after the last chunk may be treated as a chunk boundary, to produce a chunk of the maximum size.

In other examples, minimum and maximum chunk sizes may be implemented differently when using modulo arithmetic techniques to find chunk boundaries. For example, the TTTD technique may utilize minimum and maximum thresholds for chunk sizes (two thresholds) and first and second divisors D1 and D2 (two divisors). In such examples, once the sliding window W reaches the minimum threshold in the next set of bytes for evaluation, the technique may begin evaluating rolling hashes for boundaries using the first and second divisors D1 and D2. For example, a first boundary may be identified at the end of the window when the remainder of the rolling hash modulo D1 (i.e., hash mod D1) equals a predefined first remainder and a second boundary may be identified at the end of the window when the remainder of the rolling hash modulo D2 (i.e., hash mod D2) equals a predefined second remainder. In such examples, if a first boundary is identified using the first divisor D1 before the sliding window reaches the maximum threshold in the set of bytes being analyzed, then that first boundary is used as a content-defined chunk boundary. In such examples, if a first boundary is not identified using the first divisor D1 before the sliding window reaches the maximum threshold in the set of bytes being analyzed, then a second boundary based on the second divisor D2 identified before reaching the maximum threshold is used as a content-defined chunk boundary, or the maximum threshold size is used as the boundary if no second boundary was identified.

Referring again to FIG. 2A, chunked data collection 252 illustrates a set of chunks C1, C2, C3, C4, and C5 into which undivided data collection 250 may be chunked by a VSCD chunking technique, as described above, when processed from beginning to end as a continuous sequence of data.

In some examples, as described above, a data collection may be provided to a backup system in portions (i.e., data portions). For example, referring to FIGS. 1 and 2A, backup system 105 may acquire data collection 250 as separate, non-overlapping data portions P1, P2, and P3, each being a portion of data collection 250, and forming a divided version 254 of data collection 250. In such examples, data portion P2 may represent a front portion of data collection 250, data portion P1 may represent a middle portion of data collection 250, and data portion P3 may represent a back portion of data collection 250. In some examples, backup system 105 may acquire data portions P1, P2, and P3 out of order relative to the ordering of data collection 250, which, as shown in FIG. 2A, is P2 followed by P1 followed by P3.

For example, in the example of FIGS. 1 and 2A, instructions 122 may acquire data portion P1 and data portion P2 of ordered collection of data 250 to be backed up in backup system 105. In such examples, data portions P1 and P2 may be examples of data portions 170 of FIG. 1. In some examples, instructions 122 may acquire data portions P1 and P2 out of order (i,e., P1 before P2), as illustrated in FIG. 2A. In such examples, data portion P2 may be ordered before data portion P1 in the ordered data collection 250 (see FIG. 2A), while data portion P1 is acquired before data portion P2, For example, as illustrated in FIG. 2A, instructions 122 may acquire data portion P1 at a first time T1 and acquire data portion P2 at a second time T2 after T1. In examples described herein, instructions 121 may chunk data portions P1 and P2 as they arrive out of order.

For example, instructions 124 may apply a variable-size content-defined chunking technique to data portion P1 (acquired at time T1) to identify at least a first content-defined chunk boundary 210 in first data portion P1 partially defining a remainder section R1 of first data portion P1. In examples described herein, instructions 121 (including instructions 124, etc.), may apply any of the variable-size content-defined chunking techniques described above, or any other suitable variable-size content-defined chunking technique.

In the example of FIG. 2A, instructions 124 may identify multiple first content-defined chunk boundaries 210 and 212 in data portion P1. In such examples, chunk boundaries 210 and 212 may define a chunk C3 from (i.e., within) data portion P1, and in response, instructions 130 may identify and dispatch chunk C3 to de-duplication comparison, as described below. In such examples, instructions 121 may identify data chunk C3 from data portion P1 that is the same size and position as the chunk C3 identified when chunking undivided data collection 250, as described above.

In such examples, after applying the chunking technique to data portion P1, there is no indication that the front of data portion P1 is a content-defined chunk boundary, so instructions 124 may maintain the section of data portion P1 between the front of data portion P1 and chunk boundary 210 as a remainder section R1 and may flag (with flag 280 of FIG. 2A) a back end of remainder section R1 (defined by content-defined chunk boundary 210) as indicating a content-defined chunk boundary, while not flagging a front end of remainder section R1 as indicating a content-defined chunk boundary.

Also, in the example of FIG. 2A, after applying the chunking technique to data portion P1, the back end of data portion P1 is not identified as a content-defined chunk boundary (and there is no flag already indicating it as a content-defined chunk boundary), so instructions 124 may maintain, as a remainder section R2, the section of data portion P1 between chunk boundary 212 and the back end of data portion P1. In such examples, instructions 124 may flag (with flag 282 of FIG. 2A) a front end of remainder section R2 as indicating a content-defined chunk boundary (i.e., boundary 212), while not flagging a back end of remainder section R2 as indicating a content-defined chunk boundary. In the example of FIG. 2A, chunk C3 and remainder sections R1 and R2 are different and non-overlapping.

In examples, described herein, instructions 124 may maintain remainder sections (e.g., sections R1 and R2) by storing them in memory, without dispatching them as chunks to de-duplication comparison, prior to either or both of applying the VSCD chunking technique to at least one other data portion and receiving a flush request. In examples described herein, remainder sections may be stored in backup system 105 in any suitable data structure (which may be referred to as a "container" herein). In some examples, each remainder section may be included in a data structure indicating metadata about the remainder section, such as, for example, the beginning offset (in a data collection) and size of the remainder section, and any flags to indicate front or back ends of the remainder section as indicating content-defined chunk boundaries. In some examples, multiple remainder section may be maintained in a single data structure (or container). In some examples, each data portion acquired by backup system 105 may be represented in such a container (data structure) including or otherwise indicating rnetadata for the data portion, such as its beginning offset in an overall ordered data collection (e.g., data collection 250) and its size. For example, the first and second data portions P1 and P2 may each be represented in a container (data structure) including their respective beginning offsets indicating their respective positions within the ordered data collection 250. In some examples, for each data portion, section or chunk, the "offset" of the portion, section or chunk may be the beginning offset of the portion, section, or chunk, which may be the offset of the first byte in that portion, section, or chunk.

In the example of FIG. 2A, instructions 122 may acquire data portion P2 at a second time T2 after time T1. In the example of FIG. 2A, second data portion P2 is ordered, in the ordered data collection 250, before first data portion P1 and before remainder section R1 of data portion P1. For example, remainder section R1 is ordered, in ordered data collection 250, after second data portion P2 and before the identified first chunk boundary 210 (i.e., before data chunk C3). In some examples, second data portion P2 is acquired by instructions 122 after identification of at least first chunk boundary 210. In some examples, second data portion P2 is acquired by instructions 122 after identification chunk boundaries 210 and 212 and after dispatching chunk C3 (determined based on identified boundaries 210 and 212) to de-duplication comparison.

In the example of FIG. 2A, instructions 126 may determine that an offset of a back end (last byte) of data portion P2 and an offset of a front end (first byte) of remainder section R1 are consecutive offsets (i.e., have no intervening offsets) and, in response, may merge remainder section R1 with second data portion P2 to create a merged section 262. In some examples, the merge may be performed by appending remainder section R1 to the back end of data portion P2, as illustrated in FIG. 2A. In such examples, the entire merged section 262 (i.e., data portion P2 and remainder section R1 together) forms a sequence of the ordered data collection 250 without any gap(s).

In the example of FIG. 2A, instructions 128 may apply the VSCD chunking technique to merged section 262 to identify a second content-defined chunk boundary 214 in merged section 262. In such examples, chunk boundaries 214 and 210 may define a data chunk C2 of data collection 250 in merged section 262. In such examples, data chunk C2 is defined such that data chunk C2 is bounded by boundaries 214 and 210. In examples described herein, a data chunk or other section of data described as being bounded by or between chunk boundaries may include bytes having the offsets of the chunk boundaries, exclude bytes having the offsets of the chunk boundaries, or a combination thereof. For example, data chunks bounded by or between chunk boundaries may include a byte at the offset of the chunk boundary defining the front of the data chunk, and may exclude (i.e., end before) a byte at the offset of the chunk boundary defining the back of the data chunk. As an example, in the example of FIG. 2A, data chunk C3 may include the byte at the offset of chunk boundary 210, and may exclude the byte at the offset identified by chunk boundary 212 (i.e., end at the byte immediately before boundary 212), such that remainder section begins with the bytes at the offset of chunk boundary 212. In some examples, at least some instructions may be shared or common between instructions 124 and instructions 128 (though illustrated separately in the example of FIG. 1.)

In some examples, instructions 130 may identify or define data chunk C2 based on the identified boundary 214 and flag 280 indicating a content-defined chunk boundary, as described above, and may dispatch data chunk C2 to de-duplication comparison. In such examples, instructions 121 may determine chunk C2 from data portions P1 and P2 (acquired separately and out of order) that is the same size and position as the chunk C2 determined when chunking undivided data collection 250, as described above.

As noted above, instructions 130 may dispatch identified data chunks to de-duplication comparison. For example, instructions 130 may provide identified data chunks, reference(s) to identified data chunks, or the like, to other instructions, engine(s), etc., that perform de-duplication comparison. In the example of FIG. 1, instructions 132 may perform de-duplication comparison for backup system 105. In such examples, instructions 132 may perform a de-duplication comparison process for each dispatched data chunk. For example, to perform the de-duplication comparison process for a dispatched data chunk, instructions 132 may derive a content-based representation of a dispatched data chunk and compare the representation of the dispatched data chunk to respective content-based representations of data chunks 145 previously stored in persistent storage 140 of backup system 105. Instructions 132 may further determine whether to store a dispatched data chunk in persistent storage 140 based on the de-duplication comparison between the respective representations of the dispatched data chunk and the stored data chunks 145.

In examples described herein, a content-based representation of a data chunk may be a content-based fingerprint of the content of the data chunk, which may be data derived from the content (data) of the data chunk itself such that the derived data identifies the data chunk it represents and is distinguishable, with a very high probability, from similarly-derived content-based fingerprints for other similarly-sized data chunks (i.e., very low probability of collisions for similarly-sized data portions). For example, a fingerprint may be derived from a data portion using a fingerprint function. A content-based fingerprint may be derived from a data chunk using any suitable fingerprinting technique. In some examples, a content-based fingerprint may be a hash derived from a data chunk using any suitable hash function (e.g. SHA-1, etc.).

In such examples, to perform the de-duplication comparison process for a dispatched data chunk, instructions 132 may calculate a hash of a dispatched data chunk and compare the calculated hash of the dispatched data chunk to respective hashes of data chunks 145 previously stored in persistent storage 140 of backup system 105. In such examples, the previously stored data chunks 145 and their respective hashes (in a suitable data structure) may be stored in persistent storage 140. Instructions 132 may further determine whether to store a dispatched data chunk in persistent storage 140 based on the de-duplication comparison between the respective hashes of the dispatched data chunk and the data chunks 145 previously stored in persistent storage 145 to determine whether the hash of the dispatched data chunk is among the hashes of the stored data chunks, indicating that the dispatched data chunk is already stored in persistent storage 140.

In some examples, instructions 132 may compare the hash of a dispatched data chunk directly to the hashes of stored data chunks 145. In other examples, instructions 132 may compare a data structure constructed based on hashes of a plurality of dispatched data chunks (e.g., a hash-based directed acyclic graph (DAG)) to a corresponding data structure (e.g., hash-based DAG) representing hashes of the stored data chunks 145, for a more efficient comparison. Although, for explanatory purposes, examples are described herein in relation to hashes, any other suitable type of content-based fingerprints may be used.

In the example of FIG. 1, instructions 132 may determine to store a dispatched data chunk in persistent storage 140 when the hash of the dispatched data chunk is not among the respective hashes of the stored data chunks 145. In such examples, instructions 132 may determine not to store a dispatched data chunk in persistent storage 140 when the hash of the dispatched data chunk is found among the respective hashes of the stored data chunks 145 (i.e., determine not to store it again). In this manner, instructions 132 may implement de-duplication when backing up data provided to backup system 105 for backup. In the example of FIGS. 1 and 2A, instructions 132 may determine to store dispatched data chunk C3 in persistent storage 140 when the hash of data chunk C3 is not among the respective hashes of the stored data chunks 145, and may determine not to store data chunk C3 in persistent storage 140 (i.e., store it again) when the hash of data chunk C3 is found among the respective hashes of the stored data chunks 145.

In examples described herein, the persistent storage of a backup system (e.g., backup system 105) may be non-volatile storage where data chunks are stored for the purpose of persistent data backup. For example, such persistent storage may be different than volatile or other working memory used by a backup system (e.g., backup system 105) to store data while performing functions on the data, such as de-duplication, prior to persistent storage of some or all of the data chunks.

Returning to the example of FIG. 2A, the front of data portion P2 may be the front of data collection 250. In such examples, a beginning offset of data portion P2 may indicate the beginning of ordered data collection 250. For example, the beginning offset of data portion P2 may be zero (i.e., if the offsets of data collection 250 start with 0), thus indicating the beginning of ordered data collection 250. In such examples, instructions 128 may treat the front of data portion P2 (and thus the front of merged section 262) as a chunk boundary, and identify a data chunk C1 defined by (i.e., bounded by) the front of data portion P2 and boundary 214 (i.e., the next content-defined boundary identified in merged section 262). In such examples, instructions 121 may determine data chunk C1 from data portion P2 that is the same size and position as data chunk C1 determined when chunking undivided data collection 250, as described above.

In such examples, in response to a determination that the offset (i.e., beginning offset) of second data portion P2 indicates a beginning of ordered data collection 250, instructions 130 may dispatch, to de-duplication comparison, data chunk C1 bounded by the front end of second data portion P2 (at the offset indicating the beginning of ordered data collection 250) and second content-defined chunk boundary 214.

Instructions 122 may further acquire third data portion T3 of ordered data collection 250 at a third time T3 after each of times T1 and T2. In the example of FIG. 2A, data portion P3 is ordered, in the ordered data collection 250, after data portions P1 and P2, and after remainder section R2. For example, remainder section R2 is ordered, in ordered data collection 250, directly before data portion P3. In some examples, third data portion P3 may be acquired by instructions 122 after identification of at least chunk boundaries 210 and 212. In some examples, third data portion P3 is acquired by instructions 122 after identification chunk boundaries 210 and 212 and after dispatching chunk C3 to de-duplication comparison. In some examples, third data portion P3 may be acquired by instructions 122 after identification of at least chunk boundaries 210, 212, and 214. In some examples, third data portion P3 may be acquired by instructions 122 after identification and dispatching of chunks C1, C2, and C3 to de-duplication comparison.

In the example of FIG. 2A, instructions 126 may determine that an offset of a back end (last byte) of remainder section R2 and an offset of a front end (first byte) of data portion P3 are consecutive offsets (i.e., having no intervening offsets) and, in response, may merge remainder section R2 with third data portion P3 to create a merged section 264. In some examples, the merge may be performed by appending data portion P3 to the back end of remainder section R2, as illustrated in FIG. 2A. In such examples, the entire merged section 264 (i.e., remainder section R2 and data portion P3 together) forms a sequence of ordered data collection 250 without any gap(s).

In the example of FIG. 2A, instructions 128 may apply the VSCD chunking technique to merged section 264 (including at least third data portion P3) to identify a content-defined chunk boundary 218 at least partially defining a data chunk C4 and a remainder section R3. In such examples, chunk boundaries 212 and 218 may define data chunk C4 of data collection 250 in merged section 264. In such examples, data chunk C4 is defined such that data chunk C4 is bounded by boundaries 212 and 218. In some examples, instructions 130 may identify data chunk 04 based on the identified boundary 218 and flag 282 indicating a content-defined chunk boundary at the front of remainder section R2, as described above. In such examples, instructions 121 may determine data chunk C4 from data portions P1 and P3 (acquired separately and out of order), such that data chunk 04 is the same size and position as the data chunk C4 determined when chunking undivided data collection 250, as described above and shown in FIG. 2A. In response to the identification of data chunk C4 from merged section 264, instructions 130 may dispatch data chunk C4 to de-duplication comparison.

After applying the chunking technique to merged section 264, there is no indication that the back of merged section R3 is a content-defined chunk boundary. In such examples, instructions 128 may maintain the section of data portion P3 between chunk boundary 218 and the back end of merged section 264 and as a remainder section R3, and may flag (with flag 284 of FIG. 2A) a front end of remainder section R3 (defined by content-defined chunk boundary 218) as indicating a content-defined chunk boundary. In the example of FIG. 2A, instructions 121 do not flag a back end of remainder section R3 as indicating a content-defined chunk boundary, as none was identified there. In the example of FIG. 2A, chunk C4 and remainder section R3 are different and non-overlapping. In such examples, instructions 121 may produce data chunk C4 from merged section 264 that is the same size and position (in data collection 250) as data chunk C4 identified when chunking undivided data collection 250 (see 254), as described above.

In the example of FIG. 2A, instructions 122 may acquire a flush request at a time T4 after time T3. In such examples, a backup client or other entity that provided data portions P1, P2, and P3 to backup system 105 may provide the flush request. Such a flush request may be provided for various reasons, such as to indicate that the entire data collection 250 has been provided, to request that all provided data be processed before any further data is provided, or the like.

In response to the flush request, instructions 130 may dispatch, to de-duplication comparison, remainder section R3 (of ordered data collection 250), which is partially defined by a previously-identified content-defined chunk boundary 218 (indicated by flag 284) and which has not been dispatched prior to receipt of the flush request. In such examples, the remainder section R3 maintained, and not previously dispatched, may be dispatched to de-duplication comparison as a data chunk C5. In such examples, instructions 121 may produce data chunk C5 from data portion P3 that is the same size and position (in data collection 250) as data chunk C5 identified when chunking undivided data collection 250 (see 254), as described above. In this manner, examples described herein may produce a separately-chunked data collection 256 including data chunks C1-C5 that are each the same size and position (in data collection 250) as the data chunks C1-C5 produced when undivided data collection 250 is chunked as a whole (see data collection 252). In the examples of FIGS. 1 and 2A, the data chunks C1-C5 are each separate and non-overlapping, and together (ordered according to their respective beginning offsets) form data collection 250 without any gap(s).

Although, for illustrative purposes, examples are described herein in relation to a data collection 250 acquired in three separate data portions P1-P3, in other examples, a data collection may be acquired in more or fewer data portions. In such examples, instructions 121 may acquire more or fewer than three separate data portions of a data collection prior to acquisition of a flush request.

Referring to FIGS. 1 and 2B, FIG. 2B illustrates a portion of an example process of chunking data portions of a data collection acquired out of order, in which a data portion P4 is one of a plurality of data portions of the data collection, which are acquired out of order and chunked as they arrive, as in the different example described above in relation to FIG. 2A. In the example of FIG. 2B, instructions 122 may acquire a data portion P4 at a time TX, after definition of remainder sections R4 and R5 from other data portions acquired before time TX (and in some examples, chunked before time TX). A front end of remainder section R4 may be flagged (with a flag 285) indicating a content-defined chunk boundary, and a back end of remainder section R5 may be flagged (with a flag 286) indicating a content-defined chunk boundary, as described above.

In the example of FIG. 2B, instructions 126 may determine that an offset of a back end (last byte) of remainder section R4 and an offset of a front end (first byte) of data portion P4 are consecutive offsets (i.e., have no intervening offsets). Instructions 126 may also determine that an offset of a back end (last byte) of data portion P4 and an offset of a front end (first byte) of remainder section R5 are consecutive offsets (i.e., have no intervening offsets). In response to these determinations, instructions 126 may merge remainder section R4 (i.e., a "leading" remainder section ordered before data portion P4) and remainder section R5 (i.e., a "trailing" remainder section ordered after data portion P4) with data portion P4 to create a merged section 265. In some examples, remainder section R4 may be merged with a front end of data portion P4 and remainder section R5 may be merged with a back end of data portion P4.

In some examples, the merge may be performed by appending data portion P4 to the back end of remainder section R4, and appending remainder section R5 to the back end of data portion P4, as illustrated in FIG. 2B. In such examples, the entire merged section 265 (i.e., remainder sections R4 and R5 and data portion P2 together) forms a sequence of the ordered data collection 250 without any gap(s).

In such examples, instructions 128 may apply the VSCD chunking technique to merged section 265 to identify a content-defined chunk boundary 219 in merged section 262. In some examples, instructions 130 may identify a data chunk C6 based on the identified boundary 291 and flag 285 indicating a content-defined chunk boundary at the front end of remainder section R4, as described above. In response to the identification of data chunk C6, instructions 130 may dispatch data chunk C6 for de-duplication comparison, as described above. In some examples, instructions 130 may also identify a data chunk C7 based on the identified boundary 219 and flag 286 indicating a content-defined chunk boundary at the back end of remainder section R5, as described above. In response to the identification of data chunk C7, instructions 130 may dispatch data chunk C7 for de-duplication comparison, as described above.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution.

In some examples, instructions 121 may be part of an installation package that, when installed, may be executed by processing resource 110 to implement the functionalities described herein in relation to instructions 121. In such examples, storage medium 120 may be a portable medium, such as a CD, DVD, or flash drive, or a memory maintained by a server from which the installation package can be downloaded and installed. In other examples, instructions 121 may be part of an application, applications, or component(s) already installed on a computing device 100 including processing resource 110. In such examples, the storage medium 120 may include memory such as a hard drive, solid state drive, or the like. In some examples, functionalities described herein in relation to FIGS. 1-2B may be provided in combination with functionalities described herein in relation to any of FIGS. 3-5.

Figure 3:
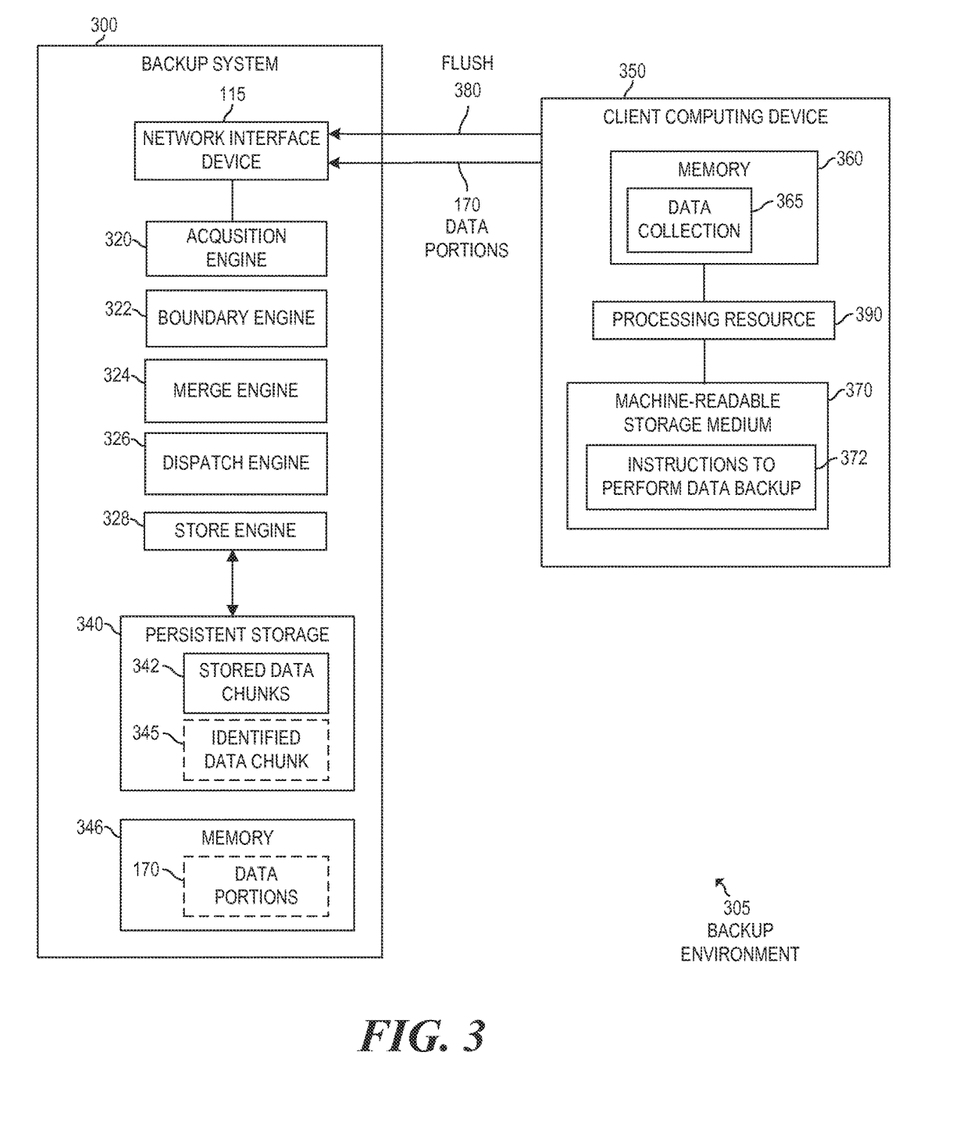
FIG. 3 is a block diagram of an example backup environment including an example backup system to identify content-defined chunk boundaries.

FIG. 3 is a block diagram of an example backup environment 305 including an example backup system 300 to identify content-defined chunk boundaries. System 300 may be implemented by at least one computing device and may include at least engines 320, 322, 324, 326, and 328, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In such examples, the at least one machine-readable storage medium may store instructions that, when executed by the at least one processing resource, implement the engines of system 300. In such examples, system 300 may include the at least one machine-readable storage medium storing the instructions and the at least one processing resource to execute the instructions, or one or more of the at least one machine-readable storage medium may be separate from but accessible to system 300 and the at least one processing resource (e.g., via a computer network).

In some examples, the instructions can be part of an installation package that, when installed, can be executed by the at least one processing resource to implement at least the engines of system 300. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 300 including the processing resource. In such examples, the machine-readable storage medium may include memory such as a hard drive, solid state drive, or the like. In other examples, the functionalities of any engines of system 300 may be implemented in the form of electronic circuitry.

System 300 also includes a network interface device 115, as described above, persistent storage 340, and memory 346. In some examples, persistent storage 340 may be implemented by at least one non-volatile machine-readable storage medium, as described herein, and may be memory utilized by backup system 300 for persistently storing data provided to backup system 300 for backup, such as non-redundant (e.g., de-duplicated) data of data collections provided for backup. Memory 346 may be implemented by at least one machine-readable storage medium, as described herein, and may be volatile storage utilized by backup system 300 for performing de-duplication processes as described herein, for example. Storage 340 may be separate from memory 346. In some examples, memory 346 may temporarily store data portions 170 while performing processing operations on them, such as de-duplication as described herein.

Backup environment 305 may also include a client computing device 350 (which may be any type of computing device as described herein) storing an ordered data collection 365 in memory 360, which may be implemented by at least one machine-readable storage medium. Client computing device may also include a processing resource 390 and a machine-readable storage medium 370 comprising (e.g., encoded with) instructions 372 executable by processing resource 390 to at least provide data collection 365 to backup system 300 for backup. In examples described herein, backup system 300 may be considered a remote backup system 300 relative to client computing device 350. In examples described herein, a "remote" backup system is a backup system separate from, but accessible over a computer network to, a client device to provide data for persistent storage.

For example, client computing device 350 may provide data collection 365 to backup system 300 for backup. In such examples, backup system 300 may acquire data collection 365, via network interface device 115, as a plurality of separate data portions 170 forming data collection 365, and the engines of system 300 may identify data chunks from data collection 365, as described above in relation to FIGS. 1-2B. In some examples, client computing device 350 may provide data collection 365 to backup system 300 at least partially out of order, as described above. For ease of explanation, examples of FIG. 3 are described herein in relation to FIG. 2A, in which data collection 250 may be an example of data collection 365, and data portions P1-P3 may be examples of data portions 170. In such examples, data portions P1-P3 of ordered data collection 250 are ordered by offsets (e.g., beginning offsets) for the ordered collection of data.

In such examples, acquisition engine 320 may acquire, out of order, first and second data portions P1 and P2 of ordered data collection 250 to be backed up in backup system 300. Engine 320 may acquire data portions P1 and P2 via network interface device 115.

Boundary engine 322 may apply a variable-size content-defined chunking technique to the first data portion P1 to identify first content-defined chunk boundaries 210 and 212 in the first data portion P1, the boundaries 210 and 212 defining data chunk C3 (bounded by boundaries 210) and a remainder section R1 of first data portion P1 (at least partially defined by boundary 210). In such examples, engine 322 may identify data chunk C3 based on boundaries 210 and 212. In examples described herein, engine 322 may apply any variable-size content-defined chunking technique described herein, or any other suitable variable-size content-defined chunking technique. In some examples, engine 322 may flag (with flag 280 of FIG. 2A) a back end of remainder section R1 at least partially defined by content-defined chunk boundary 210.

Merge engine 324 may merge remainder section R1 of first data portion P1 with second data portion P2 to create a merged section 262, as described above. In such examples, second data portion P2 may be ordered before first data portion P1 in ordered collection 250 and acquired by backup system 300 after identification of first chunk boundaries 210 and 212. In some examples, merge engine 324 may merge remainder section R1 with data portion P2 when a back end of data portion P2 and a front end of remainder section R1 have consecutive offsets (i.e., have no intervening offset(s)). In such examples, merged section 262 forms an uninterrupted sequence of ordered data collection 250.

In such examples, boundary engine 322 may apply the VSCD chunking technique to merged section 262 to identify a second content-defined chunk boundary 214 in merged section 262. Dispatch engine 326 may dispatch, to de-duplication comparison, a second data chunk C2 comprising data of the first and second data portions P1 and P2 and bounded by the second chunk boundary 214 and first chunk boundary 210 (e.g., based on flag 280). In such examples, dispatch engine 326 may identify and define data chunk C2 based on the identified content-defined chunk boundary 214 and the flagged back end of remainder section R1.

In such examples, store engine 328 may store, in persistent storage 340 of backup system 300, each of the identified data chunks 345 determined to be absent from persistent storage 342 based on de-duplication comparisons between the identified data chunks and data chunks 342 previously stored in persistent storage 340.

In some examples, acquisition engine may acquire a third data portion P3 of ordered data collection 250 (e.g., after acquisition of each of data portions P1 and P2, as illustrated in FIG. 2A). In such examples, boundary engine 322 may further apply the VSCD chunking technique to at least third data portion P3 to identify a third content-defined chunk boundary 218 partially defining a third data chunk C4 and a remainder section R3. For example, prior to applying the VSCD chunking technique, a remainder section R2 may be merged with data portion P3, as described above, and engine 322 may apply the VSCD chunking technique to the merged section to identify boundary 214 and data chunk C4.

In some examples, dispatch engine 326 may dispatch data chunk C4. In response to a flush request 380 (e.g., acquired from client computing device 350), engine 326 may dispatch the remainder section R3 as a data chunk C5 to de-duplication comparison, as described above. In the example of FIG. 3, data portions and remainder sections may be stored in any suitable data structure, such as the containers described above. In some examples, functionalities described herein in relation to FIG. 3 may be provided in combination with functionalities described herein in relation to any of FIGS. 1-2B and 4-5.

Figures 4, 5:
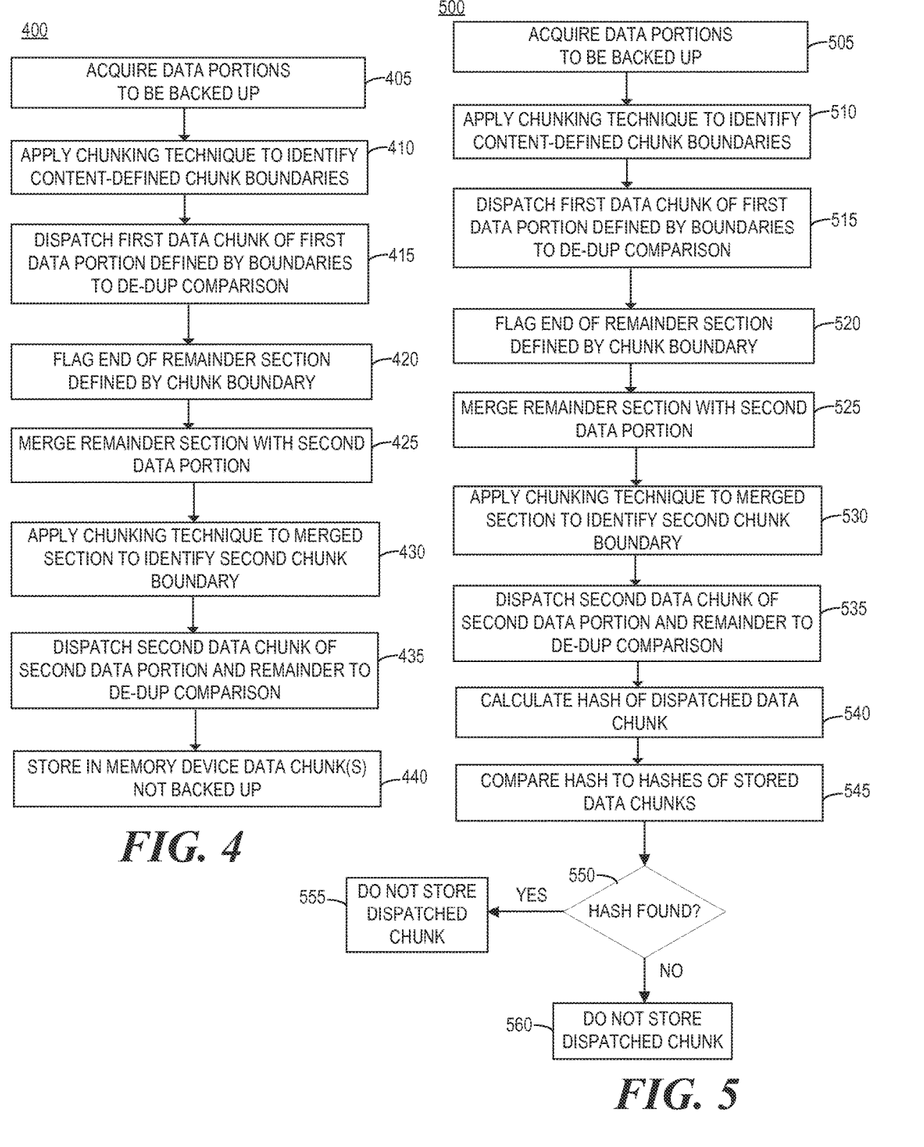
FIG. 4 is a flowchart of an example method for applying a content-defined chunking technique to a merged section.
FIG. 5 is a flowchart of an example method for storing data chunks determined to be absent from persistent memory.

FIG. 4 is a flowchart of an example method 400 for applying a content-defined chunking technique to a merged section. Although execution of method 400 is described below with reference to computing device 100 of FIG. 1A, other suitable computing devices for the execution of method 400 can be utilized (e.g., backup system 300 of FIG. 3). Additionally, implementation of method 400 is not limited to such examples. For ease of explanation, method 400 will also be explained in relation to the example of FIG. 2A.

At 405 of method 400, instructions 122 may acquire, with a network interface 115 of backup system 105, data portions P2 and P1 of an ordered data collection 250 to be backed up in backup system 105. At 410, instructions 124 may apply a variable-size content-defined chunking technique to data portion P2 to identify first content-defined chunk boundaries 210, 212 in data portion P2. At 415, instructions 130 may dispatch, to de-duplication comparison, a data chunk C3 of data portion P1 bounded by chunk boundaries 210, 212, where data chunk C3 may be identified and defined by instructions 130 based on the boundaries 210, 212.

At 420, instructions 124 may flag (e.g., with flag 280) a back end of remainder section R1 of data portion P1 defined by chunk boundary 210. At 425, instructions 126 may merge remainder section R1 with data portion P2 to create merged section 262, as described above. In some examples, data portion P2 may be ordered before data portion P1 in ordered data collection 250 and acquired by backup system 105 after dispatching data chunk C3.

At 430, instructions 128 may apply the VSCD chunking technique to merged section 262 to identify a second content-defined chunk boundary 214 in merged section 262. At 435, instructions 130 may dispatch, to de-duplication comparison, a data chunk C2 comprising data of data portion P2 and remainder section R1 and defined by chunk boundary 214 and the flagged back end of remainder section R1 (e.g., flag 280). At 440, instructions 132 may store, in persistent storage 140 of the backup system 105, each of the data chunks C2 and C3 determined to be absent from the persistent storage 140 based on the de-duplication comparisons relative to data chunks 145 previously stored in persistent storage 140.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

FIG. 5 is a flowchart of an example method 500 for storing data chunks determined to be absent from persistent memory. Although execution of method 500 is described below with reference to computing device 100 of FIG. 1A, other suitable computing devices for the execution of method 500 can be utilized (e.g., backup system 300 of FIG. 3). Additionally, implementation of method 500 is not limited to such examples. For ease of explanation, method 500 will also be explained in relation to the example of FIG. 2A.

At 505 of method 500, instructions 122 may acquire, with a network interface 115 of backup system 105, data portions P2 and P1 of an ordered data collection 250 to be backed up in backup system 105. At 510, instructions 124 may apply a variable-size content-defined chunking technique to data portion P2 to identify first content-defined chunk boundaries 210, 212 in data portion P2. At 515, instructions 130 may dispatch, to de-duplication comparison, a data chunk C3 of data portion P1 bounded by chunk boundaries 210, 212, where data chunk C3 may be identified and defined by instructions 130 based on the boundaries 210, 212.

At 520, instructions 124 may flag (e.g., with flag 280) a back end of remainder section R1 of data portion P1 defined by chunk boundary 210. At 525, instructions 126 may merge remainder section R1 with data portion P2 to create merged section 262, as described above. In some examples, data portion P2 may be ordered before data portion P1 in ordered data collection 250 and acquired by backup system 105 after dispatching data chunk C3.

At 530, instructions 128 may apply the VSCD chunking technique to merged section 262 to identify a second content-defined chunk boundary 214 in merged section 262. At 535, instructions 130 may dispatch, to de-duplication comparison, a data chunk C2 comprising data of data portion P2 and remainder section R1 and defined by chunk boundary 214 and the flagged back end of remainder section R1 (e.g., flag 280).

At 540, instructions 132 may calculate a respective hash of each of data chunks C2 and C3 as part of the de-duplication comparisons for data chunks C2 and C3, respectively. At 545, instructions 132 may, for each of the data chunks C2 and C3, compare the hash of the data chunk to respective hashes of the previously stored data chunks 145.

At 550, instructions 132 may determine, for each of dispatched data chunks C2 and C3, whether the hash of the respective data chunk is among the respective hashes of the stored data chunks. If so, then at 560. instructions 132 may determine to store the dispatched data chunk in persistent storage 140 when the hash of the dispatched data chunk is not among the respective hashes of stored data chunks 145. If not, then at 555, instructions 132 may determine not to store the dispatched data chunk in persistent storage 140 when the hash of the dispatched data chunk is among the respective hashes of stored data chunks 145. In some examples, instructions 132 may perform the functionalities described in relation to 540-560 individually for a given data chunk in response to the data chunk being dispatched.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. An article comprising at least one non-transitory machine-readable storage medium comprising instructions executable by a processing resource of a backup system to:
   acquire, out of order, first and second data portions of an ordered collection of data to be backed up in the backup system, the acquisition with a network interface device;
   apply a variable-size content-defined chunking technique to the first data portion to identify a first content-defined chunk boundary in the first data portion defining one end of a remainder section of the first data portion;
   merge the remainder section, separated from other data of the first data portion, with the second data portion to create a merged section, the second data portion ordered before the first data portion in the ordered collection and acquired after identification of the first content-defined chunk boundary;
   apply the variable-size content-defined chunking technique to the merged section to identify a second content-defined chunk boundary in the merged section;
   dispatch, to instructions executable to perform de-duplication comparison, a data chunk of the ordered collection, bounded by the first and second content-defined chunk boundaries; and
   determine whether to store the data chunk in persistent storage of the backup system based on a de-duplication comparison between respective representations of the data chunk and stored data chunks previously stored in the persistent storage.

2. The article of claim 1, wherein:
   the remainder section is ordered, in the ordered collection of data, after the second data portion and before the identified first chunk boundary; and
   the entire merged section forms an uninterrupted sequence of the ordered collection of data.

3. The article of claim 2, wherein the instructions comprise the instructions executable to perform de-duplication comparison, including to:
   calculate a hash of the data chunk dispatched to the instructions executable to perform the de-duplication comparison; and
   compare the hash to respective hashes of the stored data chunks; and
   wherein the instructions of the at least one non-transitory machine-readable storage medium are executable to determine to store, in the persistent storage, the data chunk dispatched to the instructions executable to perform the de-duplication comparison when the hash is not among the respective hashes of the stored data chunks.

4. The article of claim 3, wherein the instructions comprise instructions to:
   identify a third content-defined chunk boundary in the first data portion, wherein the first and third content-defined chunk boundaries define another data chunk within the first data portion, different than the remainder section; and
   dispatch the other data chunk to the instructions executable to perform de-duplication comparison,
   wherein the remainder section is ordered, in the ordered data collection, between the second data portion and the another data chunk.

5. The article of claim 4, wherein the instructions comprise instructions to:
   flag an end of the remainder section defined by the first content-defined chunk boundary as indicating a content-defined chunk boundary.

6. The article of claim 3, wherein:
   the first and second data portions each include offsets indicating their respective positions within the ordered collection of data; and
   the instructions further comprise instructions to:
      in response to a determination that the offset of the second data portion indicates a beginning of the ordered collection of data, dispatch, to the instructions executable to perform de-duplication comparison, an additional data chunk bounded by the second content-defined chunk boundary and a first end of the second data portion at the offset indicating the beginning of the ordered collection of data.

7. The article of claim 3, wherein:
   the instructions further comprise instructions to acquire a flush request; and
   the instructions further comprise instructions to, in response to the flush request, dispatch to the instructions executable to perform de-duplication comparison, another remainder section, of the ordered data collection, having an end defined by a previously-identified content-defined chunk boundary and that has not been dispatched prior to receipt of the flush request.

8. The article of claim 1, wherein:
the instructions comprise instructions to acquire a third data portion;
the instructions comprise instructions to merge a leading remainder section with a first end of the third data portion and merge a trailing remainder section with a second end of the third data portion to create another merged section; and
the instructions comprise instructions to apply the variable-size content-defined chunking technique to the another merged section.

9. A backup system comprising:
a processing resource; and
at least one non-transitory machine-readable storage medium comprising instructions executable by the processing resource to:
acquire, out of order, first and second data portions of an ordered collection of data to be backed up in the backup system;
apply a variable-size content-defined chunking technique to the first data portion to identify first content-defined chunk boundaries in the first data portion defining a first data chunk and a remainder section of the first data portion;
merge the remainder section of the first data portion, separated from other data of the first data portion, with the second data portion to create a merged section, the second data portion ordered before the first data portion in the ordered collection and acquired by the backup system after identification of the first content-defined chunk boundaries;
apply the variable-size content-defined chunking technique to the merged section to identify a second content-defined chunk boundary in the merged section;
dispatch, to instructions executable to perform de-duplication comparison, a second data chunk comprising data of the first and second data portions and bounded by the second and one of the first content-defined chunk boundaries; and
store, in persistent storage of the backup system, each of the first and second data chunks determined to be absent from the persistent storage based on de-duplication comparisons between the first and second data chunks and previously stored data chunks.

10. The system of claim 9, wherein the instructions comprise instructions to:
flag an end of the remainder section, the end defined by the first content-defined chunk boundary; and
identify and define the second data chunk based on the identified second content-defined chunk boundary and the flagged end of the remainder section.

11. The system of claim 9, wherein the instructions comprise instructions to:
acquire a third data portion of the ordered collection of data;
apply the variable-size content-defined chunking technique to at least the third data portion to identify a third content-defined chunk boundary defining an end of a third data chunk and an end of another remainder section; and
dispatch the third data chunk and, in response to a flush request, dispatch the another remainder section as another data chunk, each to the instructions executable to perform de-duplication comparison.

12. The system of claim 9, wherein:
the merged section forms an uninterrupted sequence of the ordered collection of data;
the data portions of the ordered collection of data are ordered by offsets for the ordered collection of data; and
the instructions comprise instructions to merge the remainder section with the second data portion when an end of the second data portion and an end of the remainder section have consecutive offsets.

13. The backup system of claim 9, wherein:
the remainder section is ordered, in the ordered collection of data, after the second data portion and before the identified first chunk boundary; and
the merged section forms an uninterrupted sequence of the ordered collection of data.

14. A method comprising:
acquiring, with a network interface of a backup system, first and second data portions of an ordered collection of data to be backed up in the backup system;
applying a variable-size content-defined chunking technique to the first data portion to identify first content-defined chunk boundaries in the first data portion;
dispatching, to instructions executable to perform de-duplication comparison, a first data chunk of the first data portion bounded by the first content-defined chunk boundaries;
flagging an end of a remainder section of the first data portion defined by one of the first chunk boundaries;
merging the remainder section, separated from other data of the first data portion, with the second data portion to create a merged section, the second data portion ordered before the first data portion in the ordered collection and acquired by the backup system after dispatching the first data chunk;
applying the variable-size content-defined chunking technique to the merged section to identify a second content-defined chunk boundary in the merged section;
dispatching, to the instructions executable to perform de-duplication comparison, a second data chunk comprising data of the second data portion and the remainder section and defined by the second content-defined chunk boundary and the flagged end of the remainder section; and
storing, in persistent storage of the backup system, each of the data chunks determined to be absent from the persistent storage based on de-duplication comparisons relative to previously stored data chunks.

15. The method of claim 14, comprising:
performing de-duplication comparison comprising, for each data chunk dispatched to instructions executable to perform the de-duplication comparison:
calculating a hash of the data chunk; and
comparing the hash of the data chunk to respective hashes of the previously stored data chunks.

16. The method of claim 15, comprising, for each data chunk dispatched to the instructions executable to perform de-duplication comparison:
determining to store the data chunk in the persistent storage when the hash of the data chunk is not among the respective hashes of the stored data chunks; and
determining not to store the data chunk in the persistent storage when the hash of the data chunk is among the respective hashes of the stored data chunks.

17. The method of claim 14, wherein:
the remainder section is ordered, in the ordered collection of data, after the second data portion and before the identified first chunk boundary; and
the merged section forms an uninterrupted sequence of the ordered collection of data.

\* \* \* \* \*